US009569326B2

(12) United States Patent
Gagliardi et al.

(10) Patent No.: US 9,569,326 B2
(45) Date of Patent: Feb. 14, 2017

(54) RULE ORGANIZATION FOR EFFICIENT TRANSACTION PATTERN MATCHING

(75) Inventors: Marco Gagliardi, Brisbane, CA (US); Neil Desai, Saratoga, CA (US)

(73) Assignee: CA, Inc., New York, NY (US)

( * ) Notice: Subject to any disclaimer, the term of this patent is extended or adjusted under 35 U.S.C. 154(b) by 1600 days.

(21) Appl. No.: 12/761,148

(22) Filed: Apr. 15, 2010

(65) Prior Publication Data

US 2011/0258209 A1    Oct. 20, 2011

(51) Int. Cl.
*G06F 17/30* (2006.01)
*G06F 11/30* (2006.01)
*H04L 29/08* (2006.01)
*H04L 12/24* (2006.01)

(52) U.S. Cl.
CPC ....... *G06F 11/3006* (2013.01); *G06F 11/3072* (2013.01); *H04L 41/0816* (2013.01); *H04L 67/22* (2013.01); *H04L 41/0213* (2013.01)

(58) Field of Classification Search
CPC .............. G06F 11/3006; G06F 11/3072; G06F 17/30598; G06F 17/30914; G06F 17/30327; H04L 41/0213; H04L 41/0816; H04L 67/22; C12Q 1/6883
USPC .......................... 707/758, 999.005; 709/224
See application file for complete search history.

(56) References Cited

U.S. PATENT DOCUMENTS

| | | |
|---|---|---|
| 6,173,280 B1 | 1/2001 | Ramkumar et al. |
| 6,587,466 B1 | 7/2003 | Bhattacharya et al. |
| 7,096,270 B2 | 8/2006 | Abjanic et al. |
| 2005/0049924 A1 | 3/2005 | DeBettencourt et al. |
| 2005/0257006 A1* | 11/2005 | Yoshida et al. ............... 711/118 |
| 2007/0266045 A1* | 11/2007 | Bansal et al. ............... 707/104.1 |
| 2007/0266148 A1* | 11/2007 | Ruiz et al. ..................... 709/224 |
| 2007/0266149 A1* | 11/2007 | Cobb et al. .................... 709/224 |
| 2010/0088404 A1* | 4/2010 | Mani et al. .................... 709/224 |
| 2010/0088670 A1 | 4/2010 | Paster |

(Continued)

FOREIGN PATENT DOCUMENTS

JP      2007-228217 A      9/2007

OTHER PUBLICATIONS

Donald E. Knuith. "The Art of Computer Programming: vol. 3: Sorting and Searching", Apr. 24, 1998.*

(Continued)

*Primary Examiner* — Yuk Ting Choi
(74) *Attorney, Agent, or Firm* — Vierra Magan Marcus LLP

(57) ABSTRACT

Efficiently identifying transactions processed by a software application, such as a server application is disclosed. In one embodiment, transactions are identified by applying a set of rules to communications between a client and server to determine whether certain patterns are in the communications. For example, the rules may look for some combination of parameters in the transactions. As a particular example, the rules may be used to look for parameters in HTTP requests. The rules are organized in a way that allows efficient processing. For example, the rules may be organized based on the frequency with which the parameters are expected to occur in the transactions and the frequency with which each transaction is expected to occur. The rules may be updated if the expected frequencies deviate from actual frequencies, such that the rules can be organized for more efficient processing.

21 Claims, 9 Drawing Sheets

(56) References Cited

U.S. PATENT DOCUMENTS

2010/0182918 A1     7/2010   Clevy et al.

OTHER PUBLICATIONS

Han et al. "Mining Frequent Patterns without Candidate Generation: A Frequent-Pattern Tree Approach", Data Mining and Knowledge Discovery, 8, 53-87, 2004.*
Extended European Search Report dated Aug. 10, 2011, European Application No. 11250465.9 filed Apr. 13, 2011, 8 pages.
Hazem Named and Ehab Al-Shaer, "Dynamic Rule-ordering Optimization for High-speed Firewall Filtering", ACM Symposium on Information, Computer and Communications Security, ACM 2006, New York, USA, pp. 332-342, 11 pages.
International Business Machines Corporation, "Quality-of-search concept for communication-related search operations", Research Disclosure, Mason Publications, Hampshire, GB, vol. 453, No. 174, Jan. 1, 2002, 2 pages.
"Scheduling Satisfying Search Under Execution-Time Constraints", IBM Technical Disclosure Bulletin, International Business Machines Corp. (Thornwood), US, vol. 31, No. 1, Jun. 1, 1988, pp. 371-372, 2 pages.
Response to European Office Action dated Apr. 19, 2012, European Patent Application No. 11250465.9, filed Apr. 13, 2011, 12 pages.
Response to European Office Action dated Feb. 18, 2013, European Patent Application No. 11250465.9, filed Apr. 13, 2011, 9 pages.
Allen, et al., "Self-organizing Binary Search Trees", Foundations of Computer Science, 1976, 17th Annual Symposium on, IEEE, Piscataway, NJ, USA, Oct. 25, 1976, pp. 166-172, 7 pages.
Lai, et al., "A Relationship Between Self-organizing Lists and Binary Search Trees," May 27, 1991, Advances in Computing and Information ICCI '91, Springer Berlin Heidelberg, Berlin, Heidelberg, pp. 111-1116, 6 pages.
European Office Action dated Oct. 8, 2012, European Patent Application No. 11250465.9, filed Apr. 13, 2011, 7 pages.
English Abstract of Japanese Publication No. JP2007-228217 published on Sep. 6, 2007.
Japanese Office Aciton dated Feb. 2, 2016, Japanese Application No. 2011-090308.
Response to Office Action dated Apr. 6, 2016, Japanese Application No. 2011-090308.
Japanese Office Action dated Apr. 21, 2015, Japanese Patent Application No. JP2011-090308.
Aso, Kazuhito, "Blocking Attack Without Signature, High-Speed Performance," by Programmable ASIC, Nikkei-Network, Japan, Nikkei Business Publications, Inc., Jan. 22, 2005, vol. 58, pp. 66-69.
Kitamura, Tsuyoshi, et al., "Application Classification Method based on Flow Behavior Analysis," Research Report by the Institute of Electronics, Information and Communication Engineers, Japan, Dec. 8, 2005, vol. 105, No. 470, pp. 13-16. (English Abstract provided).
Response to Office Action dated Jul. 17, 2015, Japanese Patent Application No. JP2011-090308.
English translation of Amendments filed in Response to Office Action dated Jul. 17, 2015, Japanese Patent Application No. JP2011-090308.
European Office Action dated Dec. 8, 2015, European Patent Application No. 11250465.9.
Nielsen, J., "Noncommand User Interfaces," Communications of the ACM, Association for Computing Machinery, Inc., US, vol. 36, No. 4, Apr. 1, 1993, pp. 83-99.
Knuth, Donald E., "The Art of Computer Programming, Sorting and Searching, Second Edition," Apr. 24, 1998, Addison-Wesley professional, vol. 3, paragraph 6.1, XP055232565.
Response to Office Action dated Apr. 15, 2016, European Patent Application No. 11250465.9.
European Office Action dated Oct. 4, 2016, European Patent Application No. 11250465.9.

* cited by examiner

RULE ORGANIZATION FOR EFFICIENT TRANSACTION PATTERN MATCHING

BACKGROUND OF THE INVENTION

Description of the Related Art

The growing presence of the Internet as well as other computer networks such as intranets and extranets has brought many new applications in e-commerce, education and other areas. Organizations increasingly rely on such applications to carry out their business or other objectives and devote considerable resources to ensuring that the applications perform as expected. To this end, various application management techniques have been developed.

One approach involves monitoring transactions that are performed by an application running on, for example, a server. Those transactions may be performed in response to a request from a client device. For example, a transaction could be a user login to a web site, a user request to purchase a product sold by the web site, a user request to use the web site to sell an item, etc. A web site administrator may want to learn how well these transactions are being performed by the software on the web site (and/or associated web sites). Therefore, the transactions could be monitored for performance metrics such as time to execute each type of transaction.

Since the software may perform many different types of transactions, the type of transaction that is being performed needs to be properly identified. There are techniques for determining the type of transaction performed for the client request. However, determining the type of transaction being executed is not necessarily a straight forward exercise. Some techniques for determining transaction type take considerable time and/or computing power.

DETAILED DESCRIPTION

A method, apparatus, and system are provided for efficiently identifying transactions processed by a software application, such as a server application. Some of the identifying of the transactions may be performed on the server that is performing the transactions. However, by efficiently identifying the transactions, server performance is not negatively impacted.

In one embodiment, transactions are identified by applying a set of rules to communications between a client and server to determine whether certain patterns are in the communications. For example, the rules may look for some combination of parameters in the transactions. As a particular example, the rules may be used to look for parameters in HTTP requests. The rules are organized in a way that allows efficient processing. For example, the rules may be organized based on the frequency with which the parameters are expected to occur in the transactions and the frequency with which each transaction is expected to occur. The rules may be updated if the expected frequencies deviate from actual frequencies, such that the rules can be organized for more efficient processing.

Network Service Monitoring

Technology disclosed herein may be implemented at least in part by a network service monitoring system that monitors a network service such as a web service, though other network services may be monitored as well. Generally, a network service can be provided over the Internet, an intranet, an extranet, a private network or other network or networks and is not limited to network services which are provided via the World Wide Web. Although some examples discussed below reference a web service, the technology discussed herein applies generally to other services that are connected to or in communication with a network or other means of communication.

Figure 1A:
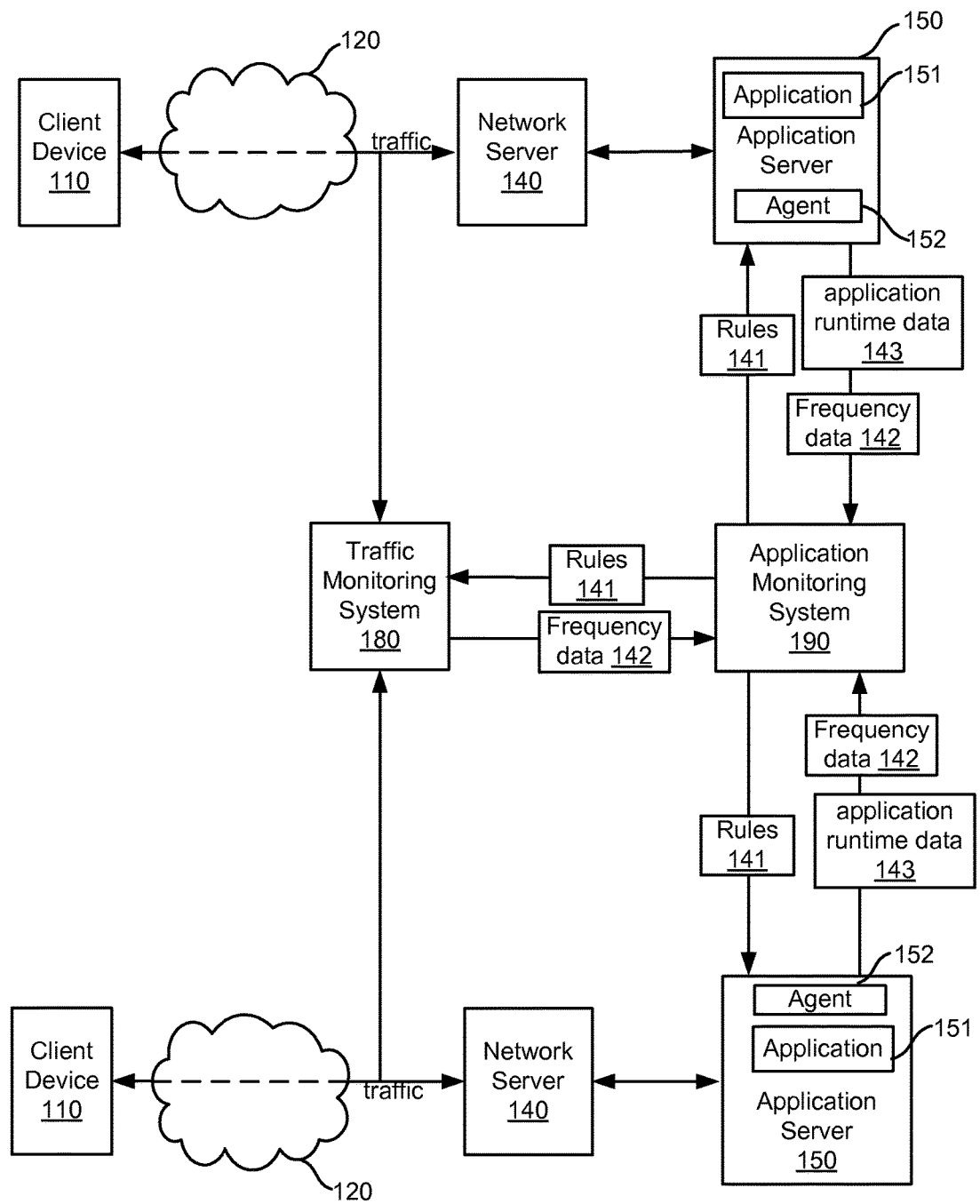
FIG. 1A is a block diagram of an embodiment of a network monitoring system which monitors a network service.

FIG. 1A depicts one example network service monitoring system. The system includes one or more network servers 140, one or more application servers 150, a traffic monitoring system 180, and an application monitoring system 190. Client devices 110 access the network servers 140 over network 120.

The network service may be provided by a network server 140 and an application server 150. In practice, any number of servers or other computing devices which are connected in any configuration can be used. Network server 140 sends traffic to and receives traffic from client device 110 over network 120, such as the Internet or other WAN, a LAN, intranet, extranet, private network or other network or networks. In practice, a number of client devices can communicate with the network server 140.

Application server 150 may be in communication with network server 140. In particular, when network server 140 receives a request from client device 110, network server 140 may relay the request to application server 150 for processing. The client device 110 can be a laptop, PC, workstation, cell phone, PDA, or other computing device which is operated by an end user. Or, the client device can be an automated computing device such as a server. Application server 150 processes the request received from the network server 140 and sends a corresponding response to the client device 110 via the network server 140.

The application monitoring system 190 may monitor the execution of one or more applications 151 of the network service. In one possible approach, the application monitoring system 190 uses one or more agents, such as agents 152, which may be considered part of the application monitoring system 190, though agents 152 are illustrated as separate blocks in FIG. 1A. Agent 152 and application monitoring system 190 may monitor the execution of one or more applications 151 at the application server 150, generate application runtime data, which represents the execution of components of the application responsive to the requests, and process the generated application runtime data 143. In some embodiments, application monitoring system 190 may be used to monitor the execution of an application or other code at some other server, such as network server 140.

For example, the application monitoring system 190 may monitor the performance of one or more applications 151 and generate corresponding application runtime data 143 which identifies, e.g., components which are invoked in one or more execution paths such as threads and/or processes of the application. Example components can include servlets, Java Server Pages, Enterprise Java Beans Java Database Connectivity components and/or Microsoft .NET components. The application runtime data 143 can provide a transaction trace, for example, which indicates the time intervals in which the components were invoked.

The traffic monitoring system 180 may observe network traffic sent and received by a network service, and may monitor traffic provided according to any type of network protocol. Although the traffic monitoring system 180 is depicted a monitoring traffic between client 110 and network server 140, the traffic monitoring system 180 may be located elsewhere. For example, traffic monitoring system 180 may observe traffic between network server 140 and application server 150.

As discussed herein, transactions that are processed by the network service may be efficiently identified. A transaction can refer to a series of related network communications that perform a function. For example, when a user logs in to a web site, the series of related network communications could be a "login transaction." If is user purchases a book on an e-commerce web site, this could be a "buy transaction." Either traffic monitoring system 180, or the agents 152, or both may identify transactions that are processed by the network service. The application monitoring system 190 may send rules 141 to the traffic monitoring system 180 and/or the agents 152. The rules 141 may be used to efficiently identify transactions. The traffic monitoring system 180 and/or the agents 152 may send frequency data 142 to the application monitoring system 190. The frequency data 142 will be discussed in greater detail below. Briefly, the frequency data may be determined based on how frequently different transactions are processed and how frequently different parameters associated with the transactions appear in the network traffic. The application monitoring system 190 may use the frequency data 142 to modify the rules 141 such that they may be executed more efficiently by the agents 152 and/or traffic monitoring system 180.

Figure 1B:
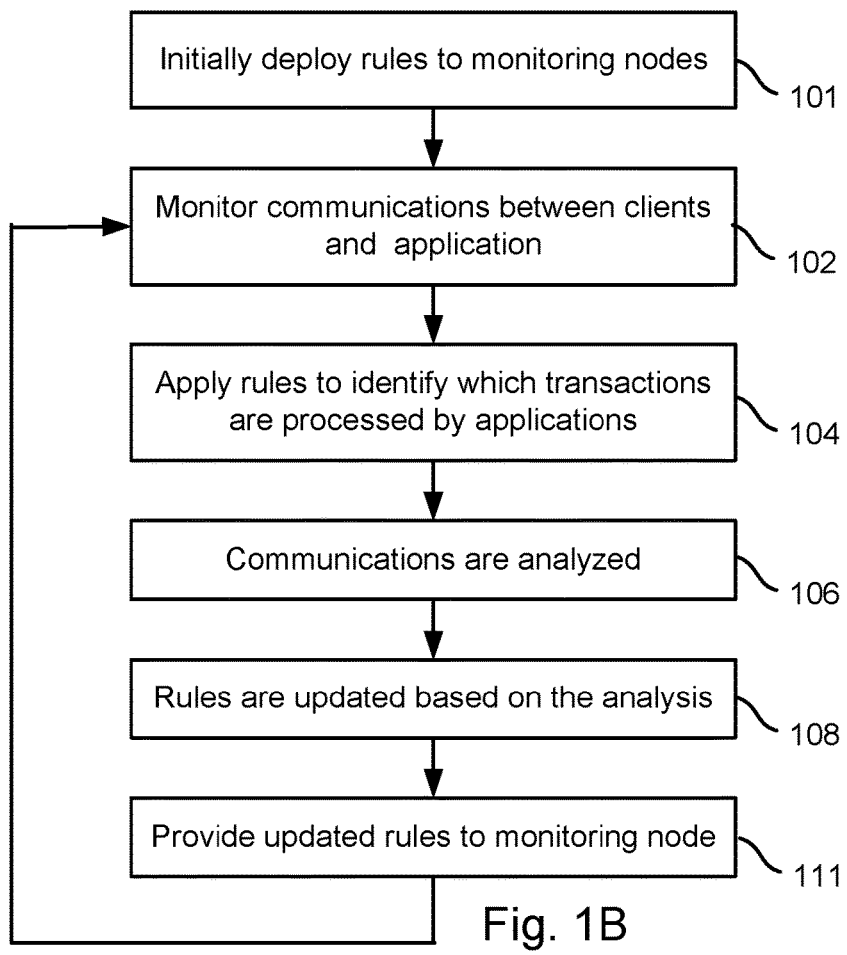
FIG. 1B illustrates a flowchart of an embodiment of a process of identifying transactions.

FIG. 1B illustrates a flowchart of an embodiment of a process of identifying transactions that are processed by applications 151. As mentioned, transactions may be identified by the traffic monitoring system 180 and/or agents 152. Note that in this and the other flowcharts provided, the steps indicated are not necessarily performed one at a time in the order indicated, but may occur simultaneously, at least in part, and/or in another order.

Figure 2A:
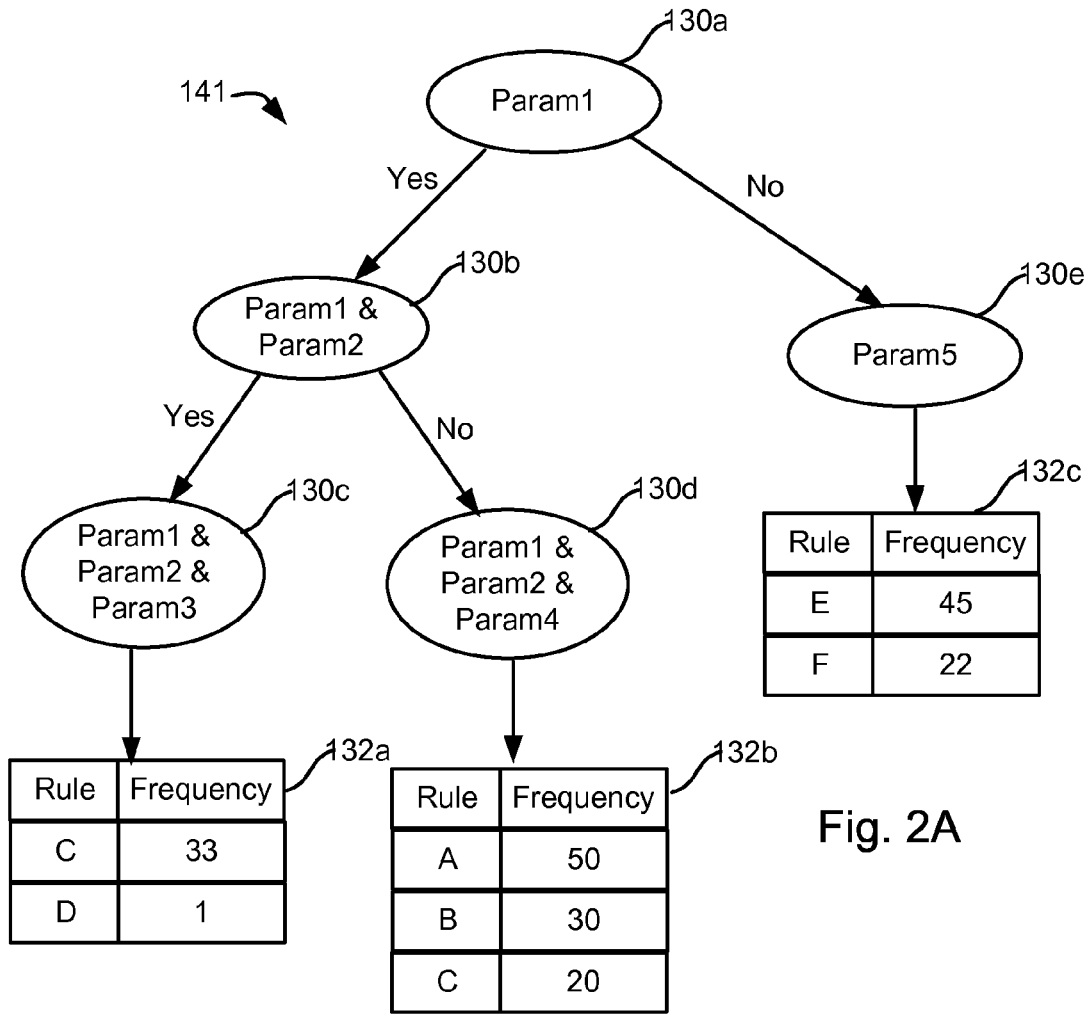
FIG. 2A depicts an example data structure that has rules that may be used to identify transactions.

In step 101, rules 141 for identifying the transactions are initially deployed on monitoring nodes. The monitoring nodes could be the agents 152 and/or the traffic monitoring system 180. The rules 141 may be organized in a way that helps them to be efficiently applied. In one embodiment, the rules 141 are included in a data structure that includes parameters associated with the transactions and rules for identifying the transactions. FIG. 2A depicts an example data structure that includes rules used to identify transactions. The data structure is organized in a way that allows the rules to be efficiently applied. FIG. 2A will be discussed in more detail below. Further details of the deployment of the initial rules are also discussed below.

In step 102, communications between the clients 102 and applications 151 are monitored. In one embodiment, agents 152 monitor the communications. In some embodiments, the agents 152 monitor the communications by monitoring the application 151. Further details of agent monitoring are discussed below. In one embodiment, communications in traffic sent to application 151, such as traffic sent between client device 110 and web server 140 over network 120, is observed by traffic monitoring system 180. The observation can involve passively copying the traffic at some intermediate point between the client 110 and the application 151 via a tap or mirror port, for instance, or intercepting the traffic, copying the intercepted traffic and relaying the intercepted traffic it to its intended destination. Note that monitoring communications may include monitoring requests sent from client 110 to network server 140 and/or responses sent from network server 140 back to client 110.

At step 104, the rules 141 are applied to identify which transactions are processed by the network service. For example, rules 141 are applied to identify which transactions are processed by the applications 151. As mentioned, the rules 141 may have a certain organization. For example, the rules 141 may be organized based on expected patterns in the transactions. Therefore, the rules 141 may be applied based on the organization. In one embodiment, applying the rules 141 is achieved by using a data structure such as the one in FIG. 2A. In this case, the organization is based on the data structure. In one embodiment, patterns in the communications are detected in order to match patterns with transactions. Transactions can be detected based on transaction definitions which specify the existence or non-existence or combination thereof of a set of name/value pairs, e.g., parameters, which are found in the communications.

At step 106, the communications are analyzed. In one embodiment, the step 106 includes determining the frequency with which each of the transactions is identified and the frequency with which each of the patterns appear in the transactions. In some embodiments, the patterns are based on parameters (e.g., HTTP parameters). In some embodiments, the patterns are based on strings (e.g., arbitrary strings of data) These determined frequencies may be termed "frequency data." In some embodiments, the frequency data 142 is transmitted from either the agents 152 or traffic monitoring system 180 to the application monitoring system 190. In one embodiment, the agents 152 analyze the communications. In one embodiment, the traffic monitoring system 180 analyzes the communications.

In step 108, the rules 141 are updated based on the analysis of the communications. Updating the rules 141 may include modifying the organization of the rules. For example, the organization of the data structure of FIG. 2A may be changed. In some embodiments, the rules 141 are updated based on the frequency with which each of the transactions was identified and/or the frequency with which each of the patterns appeared in the transactions. Updating the rules 141 may organize the rules in a way that they can be more efficiently processed at the monitoring nodes.

In step 111, the updated rules are provided to the monitoring nodes. For example, the application monitoring system 190 provides the updated rules to the agents 152 and/or the traffic monitoring system 180. The process may then return to step 102, wherein the updated rules are used to identify transactions.

FIG. 2A depicts an example of rules 141 that may be used to identify transactions. In this example the rules 141 include a data structure that is organized in a way that allows the rules to be efficiently applied. The data structure includes parameter nodes 130a-130e and rule nodes 132a-132c. In this embodiment, the data structure includes a tree. For purposes of discussion, the tree will be considered to be the portion that includes the parameter nodes 130a-130e. In general, the tree may be traversed from the root node 130a downward to arrive at one of the leaf parameter nodes 130c, 130d, 130e. Each of the leaf parameter nodes 130c, 130d, 130e points to (or includes) a rule node 132a-132c. Note that the example data structure is simplified and that a typical implementation would have many more nodes. For example, there could be many more parameter nodes 130 and the tree could have more levels. The tree may be structured such that parameters that are expected to occur with a greater frequency in the transactions are placed closer to the root. If the frequency with which the parameters occur in the transactions changes (or deviates from expected values), the tree may be re-organized. For example, parameter nodes 130 may be moved to different locations and/or the content of parameter nodes 130 may change. In some embodiments, parameters that are expected to appear more frequently are moved closer to the root. The re-organization of the tree is one way of re-organizing the rules 141 and may help to create a more efficient data structure that can be parsed more quickly.

Each rule may be associated with a certain transaction. For example, if Rule A is true, then transaction A is identified. In some embodiments, the rules in each rule node are ordered based on the frequency with which the transaction associated with rule either is expected to occur or has been identified as actually occurring. For example, in rule node 132b, Rule A has a frequency of 50 percent, Rule B has a frequency of 30 percent, and Rule C has a frequency of 20 percent. Over time if the frequency changes, the rules may be re-ordered. Re-ordering the rules in a rule node is one way to re-organize the rules and may lead to a more efficient data structure. In some embodiments, the rules that appear in a given rule node may be changed to re-organize the rules. Further details of how the tree is generated are discussed below.

Figure 2B:
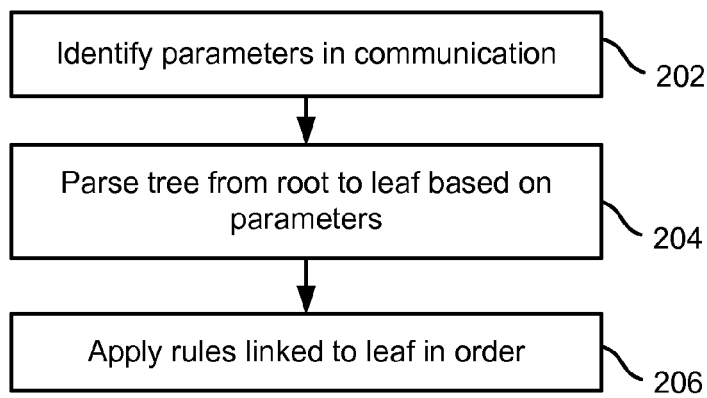
FIG. 2B is a flowchart of one embodiment of applying the data structure of FIG. 2A to identify transactions.

FIG. 2B is a flowchart of one embodiment of applying a data structure to identify transactions. The process may be performed by agents 152 and/or traffic monitoring system 160, for example. The process is one embodiment of step 104 of FIG. 1B. Reference will be made to the example data structure of FIG. 2A when discussing the process flow.

In step 202, parameters in the communications are identified. In some embodiments, this may include analyzing HTTP requests to generate an HTTP parameter name/value pair. Table 1 and Table 2 below provide one example of an HTTP request that can be parsed to determine name/value pairs. Note that the parameters could be from a protocol other than HTTP.

In step 204, the data structure is traversed from root parameter node 130a to one of the leaf parameter nodes 130c, 130d, 130e based in the identified parameters. In one embodiment, the tree is traversed by comparing the identified parameters with the parameters that are included in a parameter node 130. For example, the root parameter node 130a includes "Param1." If Param1 exists in the communications, then the "yes" branch is taken to parameter node 130b. However, if Param1 does not exist in the communications, then the "no" branch is taken to parameter node 130e. Note that parameter node 130e is a leaf parameter node; therefore, traversing the tree is complete for that path.

In the case in which the "yes" branch was taken to node 130b, then a determination is made whether both Param1 and Param2 exist in the communications. If they both exist, then the "yes" branch is taken to parameter node 130c. If one does not exist, then the "no" branch is taken to parameter node 130d. At this point, one of the leaf parameter nodes has been reached.

In step 206, the rules that are linked to the leaf parameter node are applied in order. Applying the rules may stop when a rule evaluates to true. However, it is not required that evaluation stop when one rule evaluates to true. For example, if traversing the tree arrived at the root parameter node 130d, then the rules in rule set 132b may be applied in order. Note that the rules are ordered based on the frequency with which their associated transactions are expected to occur. Thus, first Rule A is evaluated. If Rule A evaluates to true, processing may stop with the determination that Transaction A has been identified. If Rule A does not evaluate to true, then Rule B may be evaluated. Then, Rule C may be evaluated. Note that the data structure is organized such that at least one of the rules in the rule set 132b should evaluate to true. If more than one rule evaluates to true, then a tie-breaking procedure may be used. An example tie-breaking procedure is to select the most complex rule.

Figure 3B:
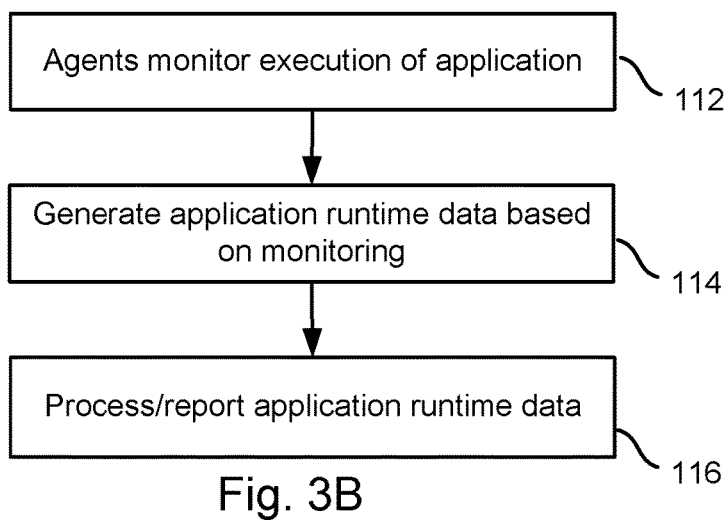
FIG. 3B illustrates a flowchart of an embodiment of monitoring a network service.
Figure 3A:
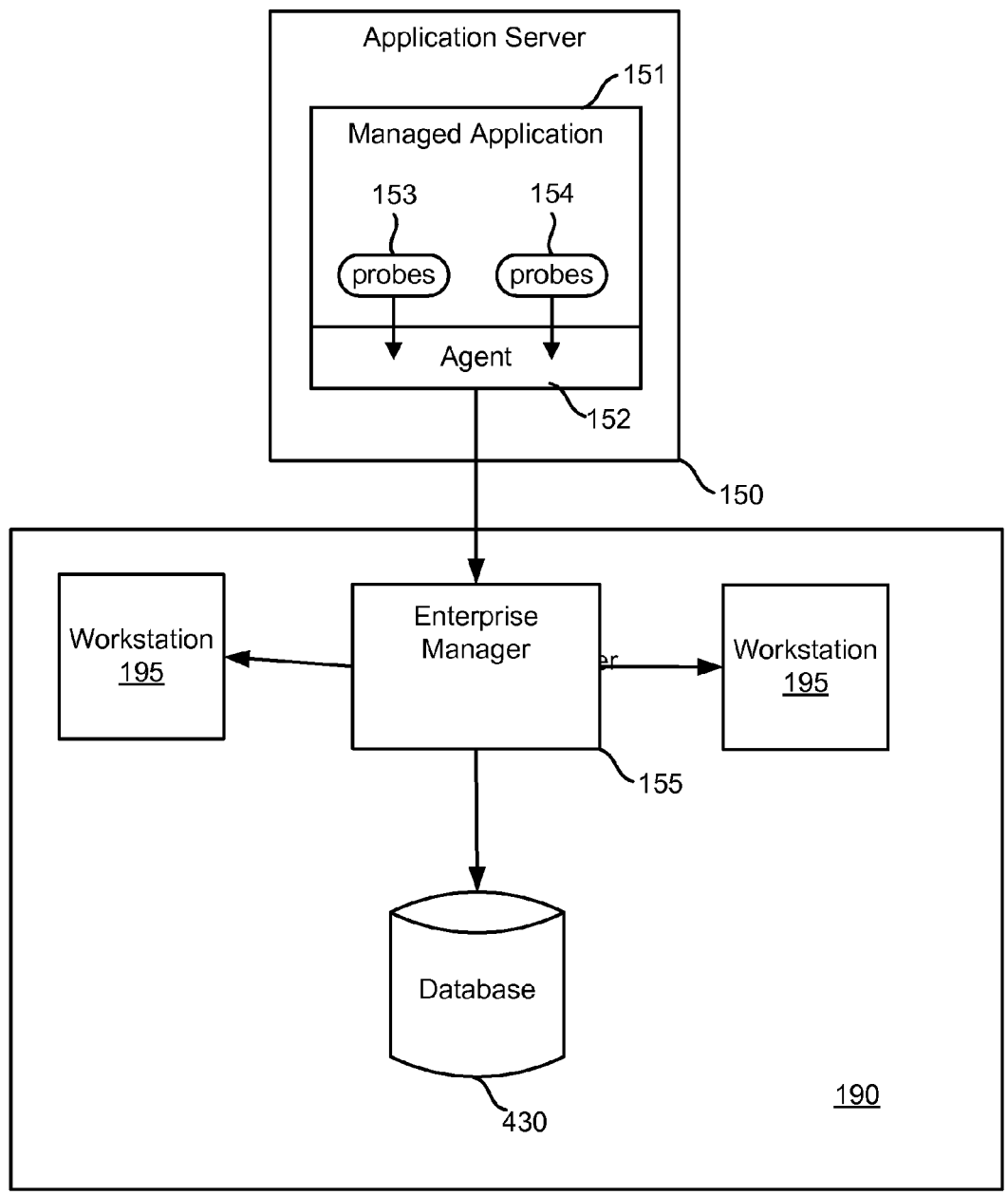
FIG. 3A is a block diagram of an embodiment of a system for monitoring a network service.

Prior to discussing further details of identifying transactions, an example system and method of an embodiment for monitoring an application will be discussed. As mentioned, in some embodiments, the transactions are identified by agents 152 in the system for monitoring an application. FIG. 3A is a block diagram of an embodiment of a system for monitoring an application. As discussed above with respect to FIG. 1A, the application monitoring system 190 may be used to monitor an application 151 and generate application runtime data. In one embodiment, FIG. 3A provides more detail for application server 150 and application monitoring system 190 of FIG. 1A. The system includes application server 150 which is in communication with Enterprise Manager 155 which, in turn, is in communication with example workstations 195 and database 430. Application server 150 includes managed application 151, which includes agent 152 and example probes 153 and 154. Application 151 can be a Java application or a different type of application.

Behavior of the application 151 can be monitored by instrumenting bytecode or intermediate language (IL) code of the application, by plugging into an exit built into the application or network server, or by any other monitoring technique. For example, information from the application 151 can also be obtained using probes 153 and 154. In practice, many such probes can be used to obtain information regarding different components of the application.

In one embodiment, a probe builder (not pictured) instruments (e.g., modifies) bytecode for application 151 to add the probes 153 and 154 and additional code. In another approach, developers add probes to the application source code. The probes may measure specific pieces of information regarding the application without changing the application's business logic. The probe builder may also add agent 152 which may be installed on the same machine as application 151 or a separate machine. Once the probes have been installed in the application, or a monitoring capability has otherwise been provided, the application is referred to as a managed application. More information about instrumenting bytecode can be found in U.S. Pat. No. 6,260,187, "System For Modifying Object Oriented Code" by Lewis K. Cirne, and U.S. patent application Ser. No. 09/795,901, "Adding Functionality To Existing Code At Exits," filed on Feb. 28, 2001, each of which is incorporated herein by reference in its entirety.

As managed application 151 runs, probes 153 and 154 send data to agent 152. In one embodiment, probes 153 and 154 may be implemented in objects and other code that write data, change data or otherwise cause the state of an application server to change. Agent 152 then collects, summarizes and sends the data, referred to as application runtime data, to Enterprise Manager 155. In response, Enterprise Manager 155 runs requested calculations, makes application runtime data available to workstations 195 and, optionally, sends the application runtime data to database 430 for later analysis. More information regarding monitoring an application using probes can be found in U.S. Patent App. Pub. No. 2004/0075690, published Apr. 22, 2004, titled, "User Interface For Viewing Performance Information About Transactions", by Lewis K. Cirne, incorporated herein by reference.

Workstations 195 provide a graphical interface for viewing application runtime data such as by creating custom views which can be monitored by a human operator. The workstations can include windows which provide a set of customizable views and depict alerts and calculators that filter application runtime data so that the data can be viewed in a meaningful way. The elements of the workstation that organize, manipulate, filter and display application runtime data can include actions, alerts, calculators, dashboards, persistent collections, metric groupings, comparisons, smart triggers and SNMP collections. In some embodiments, the workstations 195 are used to allow a user to define rules for matching transactions.

In one embodiment of the system of FIG. 3A, one or more components are running on different computing devices. Alternatively, the components can run on the same computing device. A computing device on which each component may run is discussed in more detail below with respect to FIG. 9.

In some embodiments, the agents 152 monitor the applications 151 and transfer application runtime data to the application monitoring system 190, where the data is analyzed and reported to user. FIG. 3B illustrates a flowchart of an embodiment of a process of monitoring applications 151. The process may be performed in the example system of FIG. 3A. An application 151 is monitored by agents 152 at step 112. Monitoring may involve agents 152 determining which transactions of application server 150 are processed and the duration in which they are invoked when the application processes a client request.

Application runtime data 143 based on the monitoring of the application is generated at step 114. The generated application runtime data 143 can indicate the application components involved in processing a request, the duration that each component consumed in processing a request, and other information. The application runtime data 143 can be generated by agent 152, in one possible approach, after which the agent 152 may forward the generated application runtime data 143 to application monitoring system 190, which can exist outside of application server 150, in one embodiment. Generally, application runtime data 143 can include information such as average method execution time, a method invocation rate per second or per interval, a count of method invocations, a concurrency metric indicating number of method invocations that have started but not finished per interval, and a stalled metric indicating a number of method invocations that have started whose method invocation times have exceeded a specific threshold per interval. Further, application runtime data can identify a garbage collection heap size, a bandwidth metric indicating file and socket activity, a number of threads, system logs, exceptions, memory leaks and component interactions. Note that the application runtime data may be linked to particular transactions.

The application runtime data 143 may be processed and reported by application monitoring system 190 at step 116 such as by aggregating the data, storing the data, and providing the data to an operator through an interface or other output 195.

In some embodiments, traffic monitoring system 180 and application monitoring system 190 communicate with each other to enable association of the transactions and application runtime data. In some embodiments, the traffic 180 and application monitoring systems 190 may be used together, e.g., integrated, to provide diagnostics, statistics and other data regarding the operation of a web service, network system or other system. The integrated data may be analyzed by an operator or administrator, viewed in reports, and processed to identify system health, performance or other issues of concern, for instance. Further details of a traffic monitoring system 180 and an application monitoring system 190 communicating with each other to enable association of transactions and application runtime data are discussed in Published U.S. Patent Application 2007/0266149, entitled "Integrating Traffic Monitoring and Application Runtime Data," filed on Dec. 4, 2006, which is hereby incorporated by reference in its entirety for all purposes.

Figure 4:
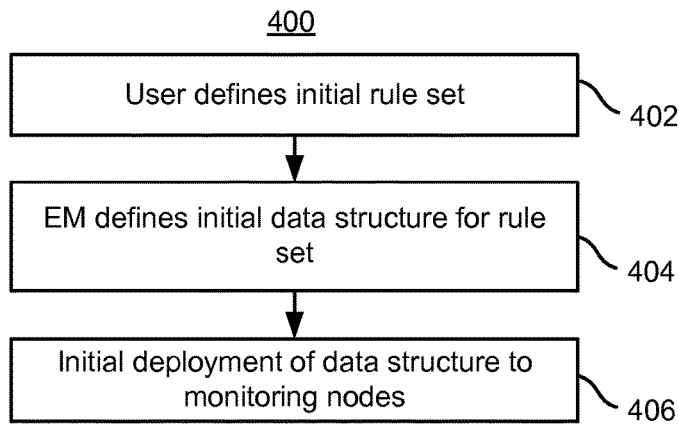
FIG. 4 is a flowchart of one embodiment of a process of initially deploying rules for identifying transactions to monitoring nodes.

Now that example systems have been discussed, further details of identifying transactions will be discussed. Reference will be made to the system of FIG. 1A and the more detailed system of FIG. 3A. However, it will be appreciated that identifying transactions is not limited to those example systems. FIG. 4 is a flowchart of one embodiment of a process 400 of initially deploying rules for identifying transactions to the monitoring nodes. Process 400 is one embodiment of step 101 of FIG. 1B. In step 402, a user defines an initial set of rules for identifying transactions. The user may input the rules through workstation 195. In some embodiments, the rules are used to match patterns in the communications between the client 110 and application server 150.

In one embodiment, each rule contains a set of parameters identified by a name. Each parameter name may have a match value, which may be compared to a parameter value in the communications (e.g., in an incoming request from the client). As examples, the match value could be a literal value or a regular expression pattern. In one embodiment, for a transaction to be matched by a rule, all the elements in the transaction request should match all the parameters in the rule, or be absent in the rule. If more than one rule matches the transaction, a tie-break strategy may be used. One example tie-breaker is to consider the most complicated rule to be the one that matches the transaction. Any form of pattern matching may be used, from simple wild-card pattern matching to more complex regular expression pattern matching.

For example, URL parameters include name/value pairs that appear in the HTTP request line before the first "?" character or in special request headers such as the Host: request header. For example, assume the user is interested in monitoring a login process which involves one or more web pages which allow a user to login to a web site. The trained operator can recognize such web pages by their URLs. Therefore, the user can assign a rule based on the URL. Cookie parameters may include name/value pairs that appear in the Cookie: request header. Post parameters may include name/value pairs that appear in the HTTP POST request-body. Query parameters may include name/value pairs that appear in the HTTP request line after the first "?" character. Session parameters may include name/value pairs that appear in such an encoded or encrypted value. Name and value specifications may specify an exact value for exact matching or a pattern for pattern matching.

In step 404, the EM 155 generates an initial data structure for the rule set. The data structure in FIG. 2A has been provided as one simple example of a data structure. Further details of generating a data structure are described below with reference to FIG. 6.

In step 406, the data structure is provided to the monitoring nodes. In some embodiments, agents 152 are provided with the initial data structure. In some embodiments, a traffic monitoring system 180 is provided with the initial data structure.

Figure 5:
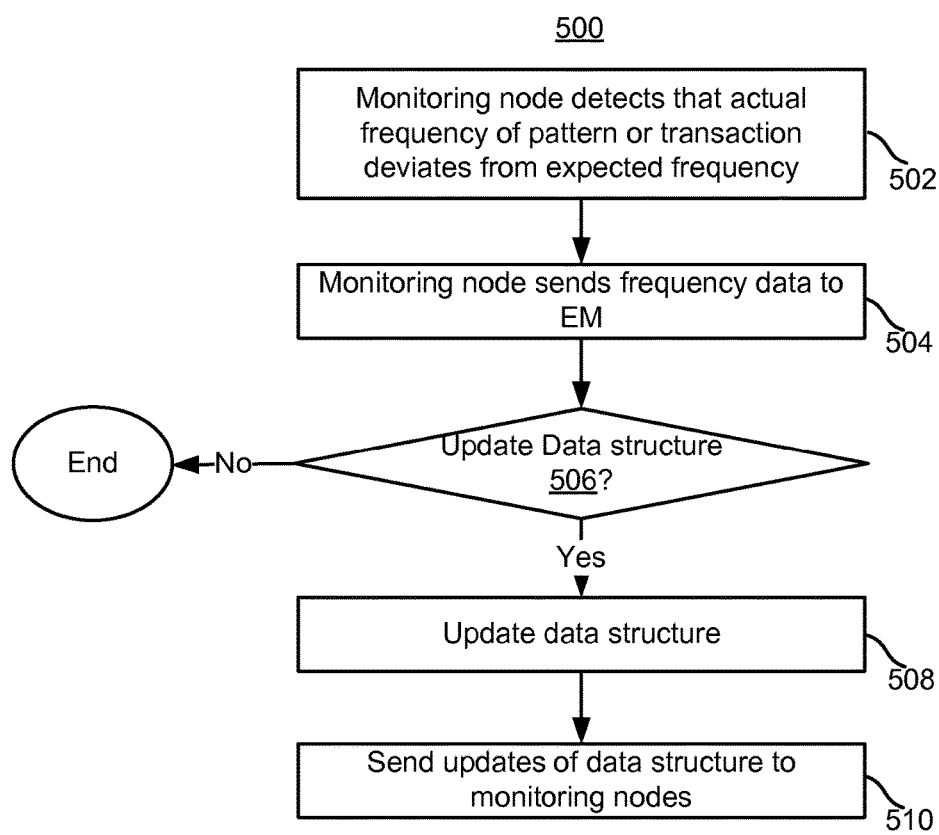
FIG. 5 is a flowchart of one embodiment of a process of updating a data structure that includes rules for matching transactions based on changes to frequency data.

FIG. 5 is a flowchart of one embodiment of a process 500 of updating a data structure that includes rules for matching transactions based on changes to the frequency data. Process 500 is one embodiment of step 108 of FIG. 1B in which rules are updated based on analysis of the communications between the client and application. Process 500 may begin after the communications are analyzed in step 106 of FIG. 1B. Recall that the analysis of the communications may include determining whether actual occurrence of parameters deviates from expected occurrence of the parameters. Also recall that the analysis of the communications may include determining whether actual occurrence of transactions deviates from expected occurrence of the transactions.

In step 502, a monitoring node detects that the actual frequency of either patterns or transactions deviates from expected frequency by more than a pre-determined amount. For example, with respect to a pattern, the monitoring node may determine that frequency of an HTTP parameter deviates from expected occurrence. The pre-determined amount may be any value and could be upward or downward. For example, a Buy Transaction might be expected to occur 50 percent of the time; however, a certain monitoring node might determine that the Buy Transaction has actually occurred 40 percent of the time. If this deviation is considered significant (e.g., is more than a pre-determined amount), then the monitoring node determines that this deviation should be reported. As another example, a certain parameter might be expected to occur 12 percent of the time; however, is found to actually occur 15 percent of the time. If this deviation is considered significant (e.g., is more than a pre-determined amount), then the monitoring node determines that this deviation should be reported. Note that the monitoring node may determine whether deviations occur at any time. For example, the monitoring node could periodically compare the expected frequencies with actual frequencies. Also note that each monitoring node may perform step 502 on its own.

In step 504, the monitoring node sends frequency data 142 to the EM 155. When reporting a deviation of one transaction, the monitoring node may report current data for all other transactions or any set of transactions. When reporting a deviation of one pattern (e.g., parameter), the monitoring node may report current data for all other parameters or any set of parameters. Also note that when reporting a deviation of a given parameter, the monitoring node might report current data for all transactions for which the rule contains the parameter, some set of those transactions for which the rule contains the parameter, all transactions, no transactions unless a deviation is found, etc. Likewise, when determining that a transaction has a deviation from expected occurrence, the monitoring node might report current data for all parameters in the rule associated with the transaction, some set of those parameters, all parameters, no parameters unless a deviation is found, etc.

In step 506, the EM 155 determines whether the rules 141 (e.g., data structure) should be updated based on the changes in the frequency data. Since there may be more than one monitoring node, the EM 155 may aggregate the frequency data from the monitoring nodes and make a determination of whether the aggregated data suggests the data structure should be updated. As mentioned, updating the data structure can lead to more efficient processing at the monitoring nodes. However, there may be a slight cost in making the updates; therefore, updates may be held off until changes are significant enough to offset the costs. Note that since the EM 155 performs the actual update to the data structure, the application servers 150 are not impacted by the update. However, there will be a certain amount of network traffic to send the updates to the monitoring nodes. It may be desirable to avoid adding substantial network traffic when making updates.

If the EM 155 determines that that data structure should be updated, then it is updated in step 508. Note that the organization of the data structure may be modified in step 508. For example, if the rules are in a data structure that includes a tree having a root, updating the rules may include placing parameters that occur in the communications with a greater frequency closer to the root of the tree. In some embodiments, there is a set of one or more rules at each lowest node in the tree. In this case, updating the rules may include ordering the rules at each of the lowest nodes of the tree based on the frequency with which the transactions are received. Further details of how the data structure is generated and updated are discussed below with respect to FIG. 7. If the EM 155 determines that updating the data structure is not yet warranted, then no changes are made. However, in either case the frequency data may be maintained such that when additional frequency data is received, updates can be made.

In step 510, updates to the rules 141 are sent from the EM 155 to the monitoring nodes. In some embodiments, only incremental updates are sent so as to avoid adding substantial network traffic. As an example, by only sending incremental updates, only changes to the data structure are sent.

Figure 6:
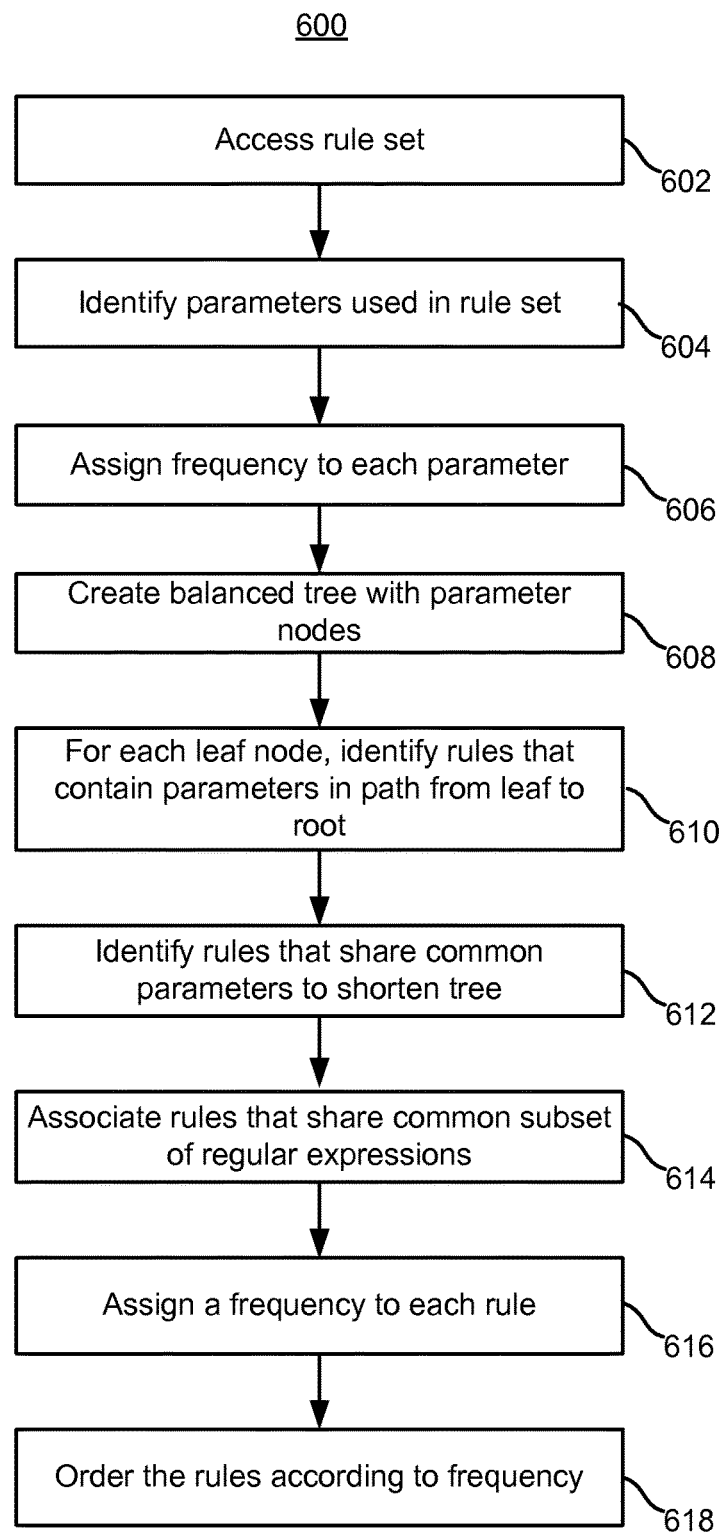
FIG. 6 depicts a flowchart of one embodiment of a process of generating or updating a data structure that includes rules for matching transactions.

FIG. 6 depicts a flowchart of one embodiment of a process 600 of generating or updating a data structure that includes rules for matching transactions. Process 600 may be used to create or update a data structure such as the example depicted in FIG. 2A. Process 600 is one embodiment of step 108 of FIG. 1B of updating the rules. Process 600 is one embodiment of step 404 of FIG. 4 of defining the initial data structure having the rules. Process 600 is one embodiment of step 508 of FIG. 5 of updating the rules a data structure having the rules. Process 600 may be performed by the EM 155. In step 602, a rule set is accessed. In one embodiment, the rule set is provided by the user as described in step 402 of FIG. 4, for example. If process 600 is being used to update the data structure, then the rule set may be accessed from storage. For example, the database 430 may be used to store the rule set that was previously provided by the user.

In step 604, parameters that are used in the rule set are identified. As mentioned, each rule may be associated with one or more parameters. For example, the rules may refer to various HTTP parameters.

In step 606, a frequency is assigned to each parameter. If no information has yet been provided regarding the actual frequency of the parameters, the initial frequency may be an estimate. The estimate may be made in many ways such as assigning an arbitrary value to parameter, assigning a value based on user input, etc. If frequency data 142 has been provided regarding the actual frequency of the parameters, the parameter frequency may be based on the frequency data 142. Note that in this latter case, the frequency data 142 may be used to alter the previous frequency values for the parameters.

In step 608, a tree is generated based on the parameters, parameter frequencies, and rules. An example, tree is depicted in FIG. 2A. Specifically, the parameter nodes 130 form the tree. In some embodiments, the tree is a binary tree. For example each parameter node 130 that is not a leaf node may have two children. In one embodiment, a parameter node 130 includes one or more parameters. In one embodiment, each parameter node 130 corresponds to an algorithm decision on what subset of rules are still possible candidates for matching. For example, the tree in FIG. 2A is for a case with Rules A-F. If the algorithm decision at parameter node 130*a* is "no" then Rules E and F remain as possible matches. If the algorithm decision at parameter node 130*a* is "yes" then Rules A, B, C and D remain as possible matches.

In one embodiment, the two child nodes for a given parameter node 130 are arrived at based on whether the parameters in the given parameter node 130 exist. For example, "yes" and "no" branches appear in the tree of FIG. 2A. In one embodiment, each parameter node 130 has decedent (e.g., children, grandchildren, etc.) nodes with other possible parameters. For example, parameter node 130*a* has decedent nodes with parameters Param5 (at node 103*e*) and Param2, Param3, and Param4 on the other path.

In general, parameters that are expected to occur more frequently may appear closer to the root of the tree. For example, Param1 appears at the root of the tree in FIG. 2A. This may be because Param1 is expected to occur more frequently than other parameters. Likewise, Param2 may be expected to occur more frequently than Param3 or Param4.

In some embodiments, the tree is balanced, to at least some extent, in order to create a more efficient structure. Note that the tree is not required to be completely balanced. For example, the tree in FIG. 2A is not completely balanced because leaf parameter node 130*e* is closer to the root parameter node 130*a* than the other leaf parameter nodes 130*c*, 130*d*.

In step 610, rules for each leaf parameter node 130 are identified. This may include identifying rules that contain one or more of the parameters in the path from leaf parameter node to root parameter node. For example, for leaf parameter node 130*d*, the parameters on the path include Param1, Param2, and Param4. A rule may contain one or more of the parameters. Thus, a rule is not required to contain all of these parameters. Thus, a set of rules for each leaf parameter node 130 is identified. Note this is not necessarily the final sets depicted in FIG. 2A.

In step 612, rules that share common parameters are identified in order to shorten the tree. However, note that the rules do not need to have the identical parameters. For example, referring to the tree in FIG. 2A, Rules C and D may share common parameters Param1, Param2 and Param3. However, Rule C may have additional parameters such as Param6, Param7, and Param8 (not depicted in the tree of FIG. 2A). In this case, the tree is not required to have additional parameter nodes for Param6, Param7, and Param8. Rather, the tree can stop at leaf parameter node 130*c*. This shortens the tree and, therefore, may lead to more efficient processing when using the tree to identify transactions.

In step 614, rules that share a common subset of regular expressions are associated with each other. For example, consider rules that have the following regular expressions:
www.google.com
www.google.1.com
maps.google.com The rules share the regular expression *.google.* If that regular expression is not found in the data traffic, the none of the rules will match. Therefore, the rules may be associated with one another to minimize the number of comparisons. For example, a notation may be added to the tree that Rules B and C are associated in this manner. Therefore, when the monitoring node looks for the common subset of regular expression in the data traffic, the monitoring node may stop processing for Rules B and C if the common subset of regular expression is not found.

In step 616, a frequency is assigned to each rule. This frequency may be an expected or actual frequency with which a rule is expected to or actually matches. Since rules may correspond to transactions, the frequency may be an expected or actual frequency with which a transactions is expected to or actually matches. The data structure of FIG. 2A depicts example frequencies assigned to rules. The values for the frequencies may be determined in a number of ways. For example, if no frequency data 142 exists, the frequency values could be assigned arbitrarily. The actual frequency data 142 from the monitoring nodes may be used to refine those values. Thus, when the monitoring nodes send actual frequency data 142, that data may be used to update the frequency values. In some case, the frequency values may be based on user input. For example, a user could input an expected frequency for a Buy Transaction.

In step 618, the rules are ordered based on the rule frequencies. For example, referring to FIG. 2A, the rules in each subset associated with a leaf parameter node are ordered form high to low. Therefore, rule processing may be efficiently performed at the monitoring nodes. After the data structure has been generated or updated, it may then be provided to the monitoring nodes. Note that it is not required that the entire data structure be provided. For example, if performing step 111 of FIG. 1B, only those portions that are necessary to provide the updates need to be provided.

Figure 7:
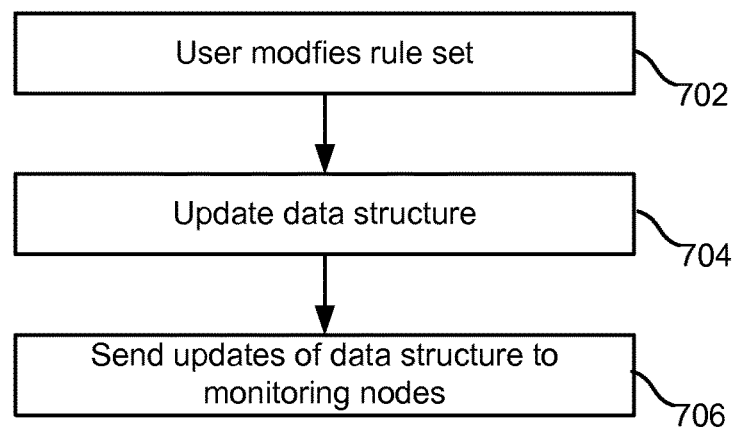
FIG. 7 is a flowchart of one embodiment of a process of a updating a data structure that includes rules for matching transactions based on input from the user.

From time to time, the user may decide that the rules for identifying transactions should be changed. FIG. 7 is a flowchart of one embodiment of a process 700 of updating the data structure based on input from the user. In step 702, the user modifies the rule set. For example, the user accesses a work station 195 and accesses a previous version of the rule set that is stored in database 430 and modifies it. The user might add new rules or delete former rules. For existing rules, the user might add or delete parameters. The user might also change the conditions upon which the rule evaluates to true.

In step 704, the EM 155 updates the organization of the rules. The process of FIG. 6 may be applied to update the rules based on a new rule set. In step 706, the updated rules are provided to the monitoring nodes. For example, agents 152 and/or traffic monitoring system 180 is provided with a new rules or at least updated portions of the rules, as well as the organization of the rules.

As discussed in step 102 of FIG. 1B, monitoring nodes may monitor communications between client 110 and application 151. In some embodiments, this may include analyzing HTTP requests to generate an HTTP parameter name/value pair. For example, a typical HTTP post request that can be parsed is shown in Table 1.

TABLE 1

Request-line: POST /dir/file.html?query1=q1&query2=q2 HTTP/1.1\r\n
request-headers: Content-type: application/x-www-form-urlencoded\r\n
  Host: www.company.com\r\n
  Cookie: cookie1=c1; cookie2=c2\r\n
  Referer: https://www.company.com/dir/home.html?action=login\r\n
  \r\n
request-body: post1=p1&post2=p2

An example of an HTTP parameter list that derived from parsing the above request is shown in Table 2. Each parameter includes a type and name/value pair.

TABLE 2 type="Query," name="query1", value="q1"
type="Query," name="query2", value="q2"
type="Cookie," name="cookie1", value="c1"
type="Cookie," name="cookie2", value="c2"
type="Post," name="post1", value="p1"
type="Post," name="post2", value="p2"
type="Url," name="Host", value="www.company.com"
type="Url," name="Path", value="/dir/file.html"
type="Url," name="Url",value="www.company.com/dir/file.html?query1=q1&query2=q2"
type="Url," name="Referer",value="www.company.com/dir/home.html?action=login"

The parameter list data may be retrieved from the HTTP request in Table 1. In particular, the parameter list query data can be retrieved from the request-line of the request, the cookie data can be retrieved from the request headers, the post data can be retrieved from the request body, and the URL data can be retrieved from the request header and request line. After determining the name/value pairs for the HTTP parameters, the monitoring node may apply the rules thereto to identify the transaction.

Note that it is not required that the parameters be HTTP parameters. Moreover, note that it is not an absolute requirement that the rules be based on parameters in the data traffic. In one embodiment, the data traffic (e.g., communications) is divided into "chunks" of data. For example, instead of looking for specific parameters that are in a certain position in the data traffic in accordance with some standard, such as an HTTP standard, the data traffic could be cut into chunks that do not necessarily correspond to certain parameters in the standard. Rules can still be assigned to match patterns in the chunks. For example, a rule could be to look for a certain string in chunk 1, another string in chuck 2, etc. In this case, instead of supplying parameters and parameter frequency to the monitoring nodes, strings and string frequencies could be provided. Because the strings do not necessarily correspond to any specific parameter, the strings may be referred to as "arbitrary strings."

Figure 8A:
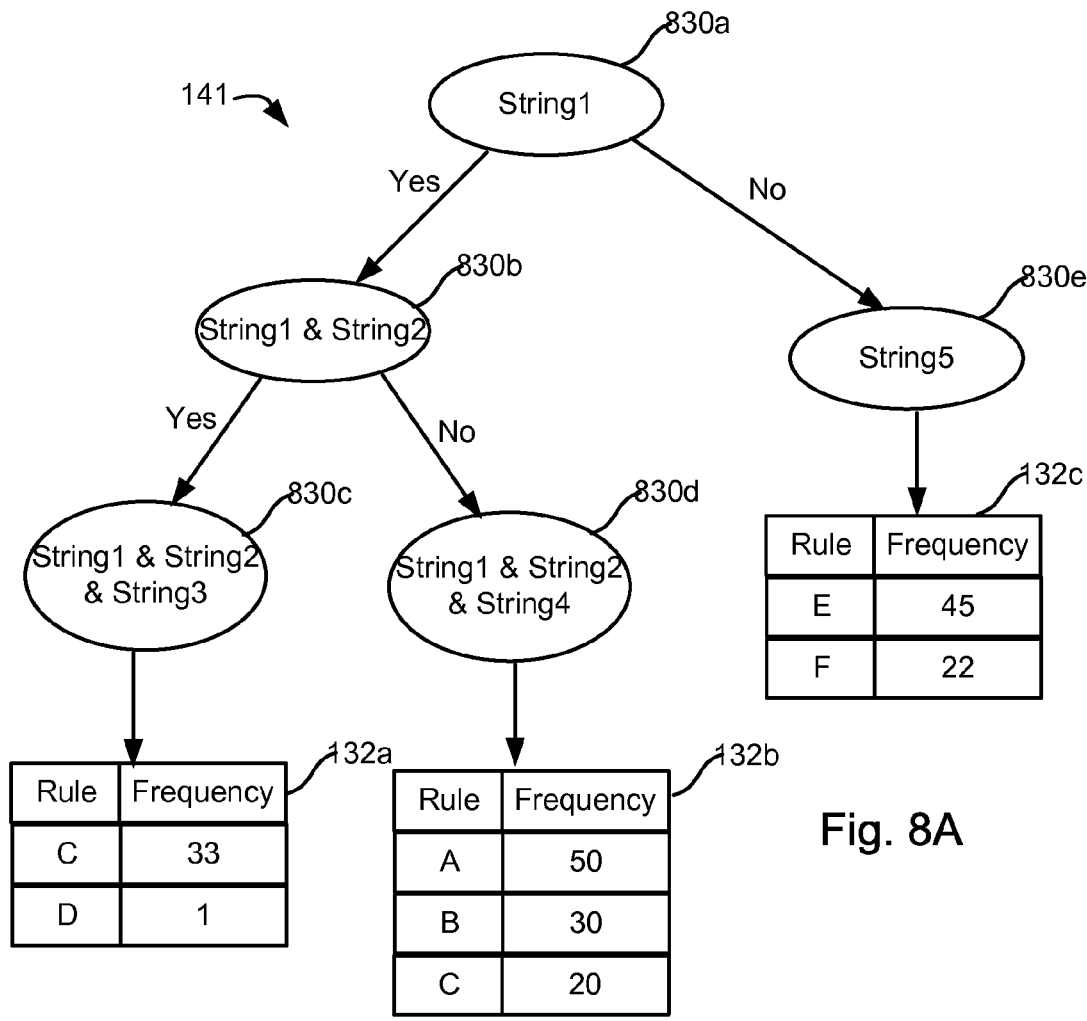
FIG. 8A depicts an example data structure that has rules based on strings that may be used to identify transactions.

As one example, the tree structure of FIG. 2A could be modified by replacing parameters with strings. FIG. 8A depicts one embodiment of a tree having string nodes 830, instead of parameter nodes 130. In this example, strings that are expected to occur with a higher frequency could appear higher in the tree. Therefore, the rules may be organized based on the strings. The organization of the tree could be modified based on actual frequencies with which strings appear in the data traffic and/or actual frequencies with which transactions are identified.

Figure 8B:
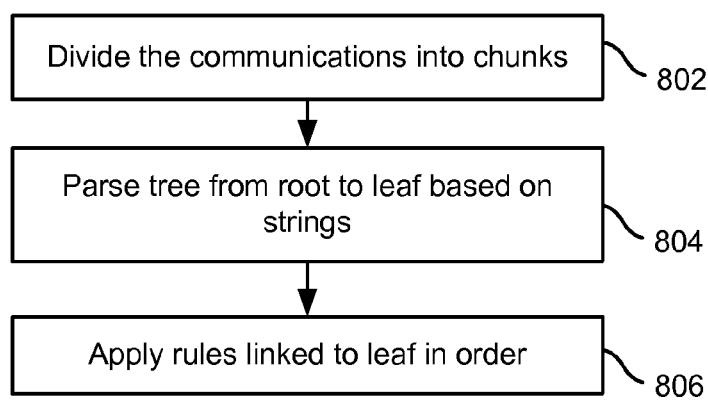
FIG. 8B is a flowchart of one embodiment of applying a data structure of FIG. 8A to identify transactions.

FIG. 8B is a flowchart of one embodiment of applying a data structure to identify transactions. The process may be performed by agents 152 and/or traffic monitoring system 160, for example. The process is one embodiment of step 104 of FIG. 1B. Reference will be made to the example data structure of FIG. 8A when discussing the process flow.

In step 802, the communications are divided into chunks. For example, starting with some reference point in the traffic (e.g., the header of a packet), the data traffic is divided into chucks of some pre-determined size. Chunks may be of different size from each other.

In step 804, the data structure of FIG. 8A is traversed from root string node 830a to one of the leaf string nodes 830c, 830d, 830e based whether strings are present in the data traffic, as it is chunked. In one embodiment, the tree is traversed by comparing a chunk with one the stings in a given string node 830.

In step 806, the rules that are linked to the leaf string node are applied in order. This may be similar to the case in which rules are based on parameters.

Figure 9:
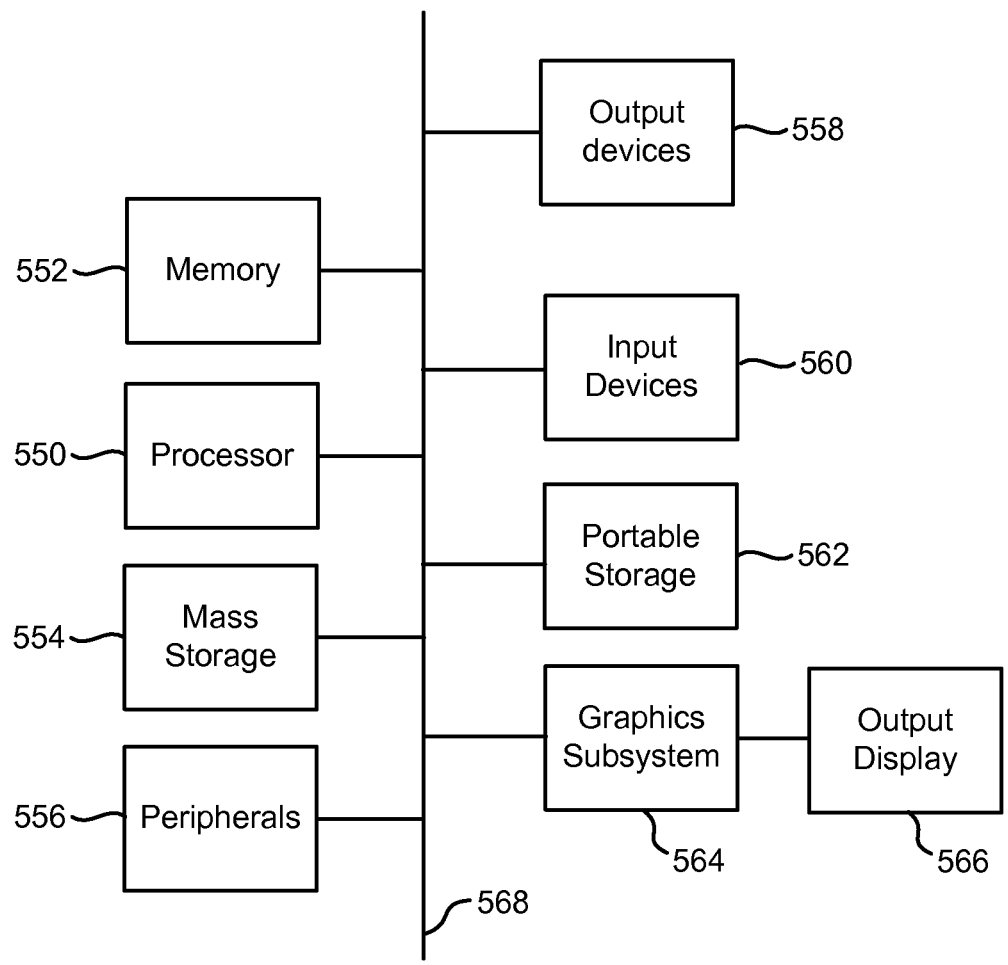
FIG. 9 is an example platform for a computer system upon which embodiments may be practiced.

FIG. 9 is a block diagram of an embodiment of a computing system for use with the present technology. The computing system may be used to as a platform for client device 110, network server 140, application server 150, Enterprise Manager 155, traffic monitoring system 180, application monitoring system 190, workstations 195, database 430, etc.

The computer system includes one or more processors 550 and main memory 552 which stores, in part, instructions and data for execution by processor unit 550. If the system of the present invention is wholly or partially implemented in software, main memory 552 can store the executable code when in operation. Also provided are a mass storage device 554, peripheral device(s) 556, user input device(s) 560, output devices 558, portable storage medium drive(s) 562, a graphics subsystem 564 and an output display 566. For simplicity, the components are depicted as being connected via a single bus 568. However, the components may be connected through one or more data transport means. For example, processor unit 550 and main memory 552 may be connected via a local microprocessor bus, and the mass storage device 554, peripheral device(s) 556, portable storage medium drive(s) 562, and graphics subsystem 564 may be connected via one or more input/output (I/O) buses. Mass storage device 554, which may be implemented with a magnetic disk drive or an optical disk drive, is a non-volatile storage device for storing data and instructions for use by processor unit 550. In one embodiment, mass storage device

554 stores the system software for implementing the present invention for purposes of loading to main memory 552.

Portable storage medium drive 562 operates with a portable non-volatile storage medium, such as a floppy disk, to input and output data and code to and from the computer system. In one embodiment, the system software for implementing the present invention is stored on such a portable medium, and is input to the computer system via the portable storage medium drive 562. Peripheral device(s) 556 may include any type of computer support device, such as an input/output (I/O) interface, to add additional functionality to the computer system. For example, peripheral device(s) 556 may include a network interface for connecting the computer system to a network, a modem, a router, etc.

User input device(s) 560 provides a portion of a user interface. User input device(s) 560 may include an alpha-numeric keypad for inputting alpha-numeric and other information, or a pointing device, such as a mouse, a trackball, stylus, or cursor direction keys. In order to display textual and graphical information, the computer system includes graphics subsystem 564 and output display 566. Output display 566 may include a cathode ray tube (CRT) display, liquid crystal display (LCD) or other suitable display device. Graphics subsystem 564 receives textual and graphical information, and processes the information for output to output display 566. Additionally, the computer system includes output devices 558. Examples of suitable output devices include speakers, printers, network interfaces, monitors, etc.

The components contained in the computer system are those typically found in computer systems suitable for use with the present invention, and are intended to represent a broad category of such computer components that are well known in the art. Thus, the computer system can be a personal computer, hand held computing device, telephone, mobile computing device, workstation, server, minicomputer, mainframe computer, or any other computing device. The computer system can also include different bus configurations, networked platforms, multi-processor platforms, etc. Various operating systems can be used including Unix, Linux, Windows, Macintosh OS, Palm OS, and other suitable operating systems.

One embodiment disclosed herein includes a method of a method of updating rules for identifying transactions. The method may include the following. Communications between clients and an application that processes transactions are monitored. Rules to identify which transactions are processed by the applications are applied. The rules are applied to based on how the rules are organized. The communications are analyzed. The organization of the rules is updated based on analyzing the communications.

One embodiment disclosed herein includes at least one processor readable storage device having processor readable code embodied thereon for programming at least one processor to perform a method. The method comprising monitoring communications between clients and an application that processes transactions having patterns; applying rules to identify which transactions are processed by the application, the rules are organized based on expected patterns in the transactions; applying the rules is based on the organization; analyzing the communications; and updating the organization of the rules based on the analyzing the communications.

One embodiment disclosed herein includes a monitoring system comprising one or more storage devices having processor executable code stored thereon and one or more processors in communication with the one or more storage devices. The code, which when executed on the one or more processors, causes the one or more processors to monitor transactions processed by applications. The transactions include in patterns. The code causes the one or more processors to apply rules to identify which transactions are processed by the applications. The rules are organized based on frequencies with which the patterns are expected to appear in the transactions and are based on frequencies with which each of the transactions is expected to be processed by the applications. The code causes the one or more processors apply the rules based on the organization of the rules. The code causes the one or more processors to determine when actual frequency of the patterns in the transactions deviates from the expected frequency of the parameters or when actual frequency of ones of the transactions deviates from the expected frequency of ones of the transactions. The code causes the one or more processors to update the organization of the rules based on the actual frequency of the patterns or the actual frequency of the transactions.

One embodiment disclosed herein includes a method of updating a data structure for identifying transactions, which includes the following. A first version of the data structure is provided to a plurality of agents that monitor applications that process transactions. The transactions have one or more parameters of a plurality of parameters. The data structure is organized based on the plurality of parameters and includes rules for identifying the transactions based on the plurality of parameters. Transactions which are processed by the applications are identified based on the organization of the data structure. Frequency data is collected by the agents. The frequency data describes frequency with which each of the transactions are identified and frequency with which each of the parameters appear in the transactions. The frequency data is provided to a manager node. The organization of the data structure is updated based on the frequency data. The updated data structure is provided to the plurality of agents.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application, to thereby enable others skilled in the art to best utilize the invention in various embodiments and with various modifications as are suited to the particular use contemplated. It is intended that the scope of the invention be defined by the claims appended hereto.

What is claimed is:

1. A method of updating rules for identifying transactions, the method comprising:
    monitoring, by a computing device, communications between clients and an application that processes transactions, including accessing patterns in the communications;
    applying, by a computing device, rules to identify which transactions are processed by the application, the rules are organized based on frequencies with which each of the patterns are expected to appear in the transactions, wherein the rules include a data structure having a root node and leaf nodes, wherein at least some of the nodes have branches to other nodes, wherein applying the rules includes transversing the data structure from the root node to one of the leaf nodes to identify a transaction in the communications, including selecting branches based on whether the accessed patterns match the patterns in the nodes;

analyzing the communications by a computing device, comprising determining a frequency with which each of patterns appear in the transactions; and updating, by a computing device, the organization of the rules based on the frequency with which each of the patterns appear in the transactions, including placing patterns having a greater frequency at a node closer to the root node of the data structure than patterns having a smaller frequency.

2. The method of claim 1, wherein the patterns are based on parameters associated with the transactions.

3. The method of claim 2, wherein the analyzing the communications further comprises determining a frequency with which each of the transactions is identified.

4. The method of claim 3, wherein the updating the organization of the rules further comprises updating the data structure based on the frequency with which each of the transactions is identified.

5. The method of claim 4, wherein a set of one or more of the rules are associated with each leaf node of the data structure.

6. The method of claim 5, wherein the updating the data structure comprises ordering the set of rules associated with each leaf node of the data structure based on the frequency with which the transactions are identified.

7. The method of claim 1, further comprising generating an initial version of the data structure, the initial version of the data structure has patterns with a greater expected frequency at a node closer to the root node of the initial version of the data structure than patterns having a smaller expected frequency.

8. The method of claim 7, further comprising deploying the initial version of the data structure to an agent that monitors the application.

9. The method of claim 8, wherein the agent determines whether actual frequency of the patterns in the transactions deviates from the expected frequency of each of the patterns, and informs a manager node if the actual frequency of the patterns deviates from the expected frequency.

10. The method of updating rules for identifying transactions of claim 9, further comprising:

the manager node sending an updated version of the data structure to the agent in response to the agent informing the manager node that the actual frequency of the patterns deviates from the expected frequency.

11. The method of claim 9, wherein the agent determines whether actual frequency of ones of the transactions deviates from expected frequency of ones of the transactions, and informs a manager node if the actual frequency of any the transactions deviates from the expected frequency.

12. The method of claim 1, wherein the patterns are based on strings in the transactions, wherein the applying rules to identify which transactions are processed comprises:

dividing the communications into chunks, the rules are organized based on the strings; and comparing the strings in the rules with the chunks in order to identify the transactions.

13. The method of updating rules for identifying transactions of claim 1, wherein the data structure is a binary tree in which each of the nodes that is not a leaf node has two children.

14. A non-transitory processor readable storage device having processor readable code embodied thereon for programming a processor to:

monitor communications between clients and an application that processes transactions and to access parameters in the communications;

apply rules to identify which transactions are processed by the application, the rules are organized based on expected frequencies of the parameters in the transactions, the processor readable storage device having processor readable code for programming the processor to traverse a data structure that is organized based on frequency with which the parameters are expected to occur in the transactions, the data structure comprising a root node and leaf nodes, at least some of the nodes comprising branches to other nodes, the nodes each comprising one or more of the parameters in the transactions, comprising code for programming the processor to traverse the data structure from the root node to one of the leaf nodes to identify a transaction in the communications, and select branches based on whether the accessed parameters match the parameters in the nodes;

analyze the communications comprising determining a frequency with which each of parameters appear in the transactions; and update the organization of the rules based on the frequency with which each of the parameters appear in the transactions, comprising code for programming the processor to place parameters having a greater frequency at a node closer to the root node of the data structure than parameters having a smaller frequency.

15. The non-transitory processor readable storage device of claim 14, wherein the code for programming the processor to analyze the communications comprises code for programming the processor to determine frequency data that comprises a frequency with which each of the transactions is identified.

16. The non-transitory processor readable storage device of claim 15, wherein the code for programming the processor to update the organization of the rules is based on the frequency data.

17. A monitoring system, comprising:

a storage device having processor executable code stored thereon; and a processor in communication with the storage device, the code, which when executed on the processor, causes the processor to monitor transactions processed by applications and to access patterns in the transactions, the code causes the processor to apply rules to identify which transactions are processed by the applications, the rules are organized based on frequencies with which the patterns are expected to appear in the transactions and based on frequencies with which each of the transactions is expected to be processed by the applications, the code causes the processor to apply the rules based on the organization of the rules, the code causes the processor to traverse a tree structure that is organized based on frequency with which the patterns are expected to occur in the transactions, the tree structure comprising a root node and leaf nodes, at least some of the nodes comprising branches to other nodes, the nodes each comprising one or more of the patterns in the transactions, patterns that are expected to have a greater frequency appear closer to the root node of the tree structure, patterns that are expected to have a lower frequency appear closer to the leaf nodes, comprising code that causes the processor to traverse the tree structure from the root node to one of the leaf nodes to identify a transaction in the communications, and select branches based on whether the accessed patterns match the patterns in the nodes, the code causes the processor to determine when actual frequency of the patterns in the transactions deviates from expected frequency of the patterns, the code causes the processor to update the organization of the rules based on the actual frequency of the patterns, the code causes the processor to place patterns having a greater frequency at a node closer to the root node of the tree structure than patterns having a smaller frequency.

18. The monitoring system of claim 17, wherein each of the leaf nodes of the tree structure is associated with a rule node, each rule node contains rules for identifying one of the transactions, the rules in the rule node are ordered based on the frequency with which the transaction associated with the rule in the rule node either is expected to occur or has been identified as actually occurring.

19. The monitoring system of claim 17, wherein the patterns are based on HTTP parameters.

20. The monitoring system of claim 17, wherein the patterns are based on arbitrary strings.

21. The monitoring system of claim 17, wherein the code causes the processor to determine when actual frequency of ones of the transactions deviates from the expected frequency of ones of the transactions, the code causes the processor to update the organization of the rules based on the actual frequency of the transactions.

* * * * *